(12) United States Patent
Lee

(10) Patent No.: US 6,480,649 B2
(45) Date of Patent: *Nov. 12, 2002

(54) LIGHT-EMITTING DEVICE FOR EMITTING STARRY LIGHT

(76) Inventor: Jean Hway Lee, 18F-2, No. 2, Lane 175, Sec.3, Shiou-Lang Rd., Chung-Ho City, Taipei Hsien, 235 (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,285

(22) Filed: Aug. 18, 1999

(65) Prior Publication Data

US 2002/0044740 A1 Apr. 18, 2002

(51) Int. Cl.[7] .................................................. G02B 6/26
(52) U.S. Cl. ........................... 385/31; 385/100; 385/901
(58) Field of Search .......................... 385/31, 100, 115, 385/116, 901

(56) References Cited

U.S. PATENT DOCUMENTS

| | | | | |
|---|---|---|---|---|
| 4,234,907 A | * | 11/1980 | Daniel | 362/32 |
| 5,187,765 A | * | 2/1993 | Muehlemann et al. | 385/115 |
| 5,432,876 A | * | 7/1995 | Appeldorn et al. | 385/31 |
| 5,659,643 A | * | 8/1997 | Appeldorn et al. | 385/31 |

* cited by examiner

Primary Examiner—Rodney Bovernick
Assistant Examiner—Sung Pak
(74) Attorney, Agent, or Firm—Troxell Law Office PLLC

(57) ABSTRACT

The inventive light-emitting device for emitting starry light comprises at least one optical fiber, each having a core, a cladding around the core and opaque cover layer around the cladding, wherein a plurality of micro-windows are formed on each optical fiber such that part of the light propagating along the core emits through the micro-windows, and provides starry light effect to the mesh woven by the optical fiber.

2 Claims, 3 Drawing Sheets

LIGHT-EMITTING DEVICE FOR EMITTING STARRY LIGHT

BACKGROUND OF THE INVENTION

1) Field of the Invention

The present invention relates to a light-emitting device for emitting starry light, which is woven by at least one optical fibers, or at least one bundle of optical fiber having a plurality of micro-windows such that light emits from the core of each optical fiber together form a starry pattern.

2) Description of the Prior Art

The conventional device for emitting light pattern across an area is generally achieved by bulbs or LEDs. However, the bulbs or LEDs are brittle and high cost, thus those device are not convenient and expensive.

SUMMARY OF THE INVENTION

It is an object of the present invention to provides a light-emitting device for emitting starry light, especially for creating a starry mesh pattern, which is safer and more convenient.

To achieve the above project, the inventive light-emitting device for emitting starry light comprises at least one optical fiber, each having a cladding around the core and opaque cover layer around the cladding, wherein a plurality of microwindows are formed on each optical fiber such that part of the light propagating along the core emits through the micro-windows, and provides starry light effect to the mesh woven by the optical fiber.

In one aspect of the invention, the mesh woven by the optical fiber with micro-windows has arbitrary shape and is hanged on the article to be decorated such as tree.

In another aspect of the invention, a transparent protective layer is used to enclose the surface of the optical fiber for protective purpose.

The various objects and advantages of the present invention will be more readily understood from the following detailed description when read in conjunction with the appended drawing, in which:

BRIEF DESCRIPTION OF THE DRAWINGS

FIG. 3-1 shows another view of a preferred embodiment of the invention;

DETAILED DESCRIPTION OF PREFERRED EMBODIMENTS

Figure 1:
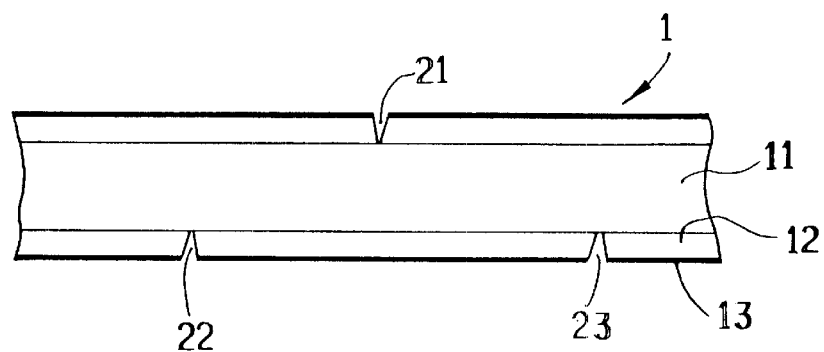
FIG. 1 shows the cross sectional view of the optical fiber in the present invention.

As shown in FIG. 1, the optical fiber used weave the light-emitting mesh of the present invention-, which comprises a core 11, a cladding 12 around the core 11, an opaque outer layer 13 around the cladding 12, and a plurality of micro-windows 21, 22 and 23 cut on the opaque outer layer 13 to expose the core 11.

Figure 2:
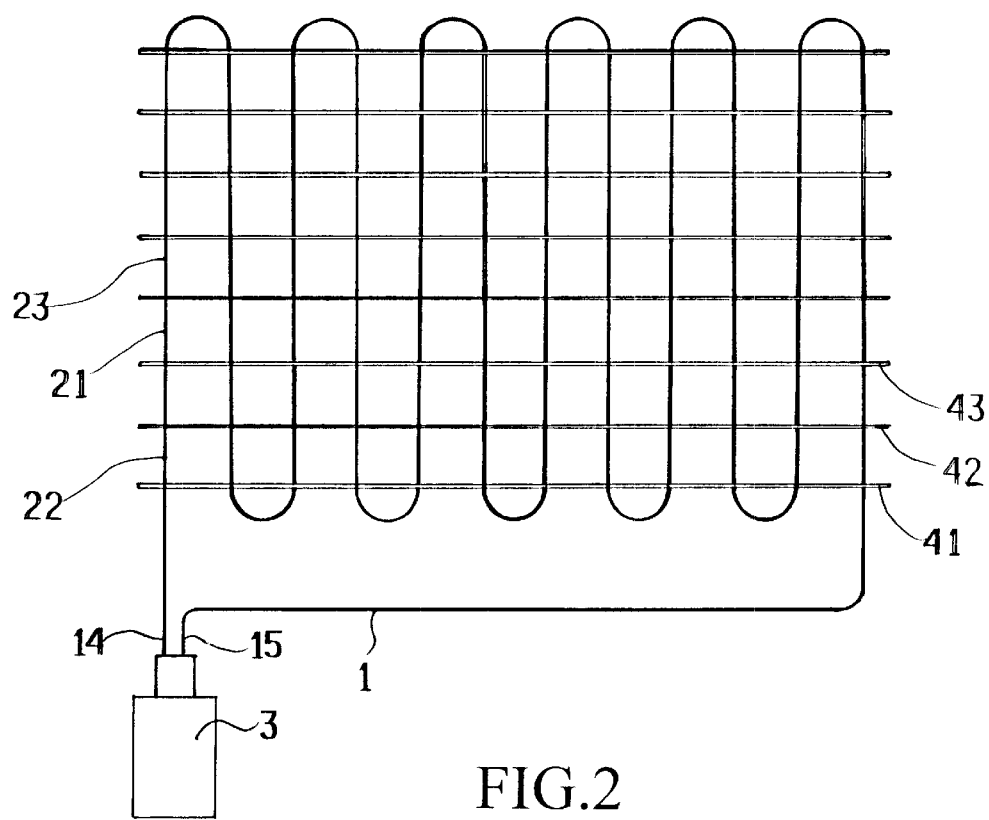
FIG. 2 shows a preferred embodiment of the invention.

As shown in FIG. 2, a plurality of optical fibers 1 are woven to form a mesh and the front end and rear end of each fiber 1 is connected to a light source 3. Moreover, a plurality of supporting lines 41, 42 and 43 are provided on the bent portion of the fiber 1 to enhance the mesh strength. The light propagating within the core 1 is attenuated along the length of the fiber 1, therefore, launching light from both ends of the fiber 1 makes the lightwave emits uniformly along the length of the fiber. As light wave emits uniformly from the core, part of the light wave emits from the micro-windows 21, 22 and 23, thus provides starry effect to the fiber mesh woven by those optical fiber 1.

Figure 3:
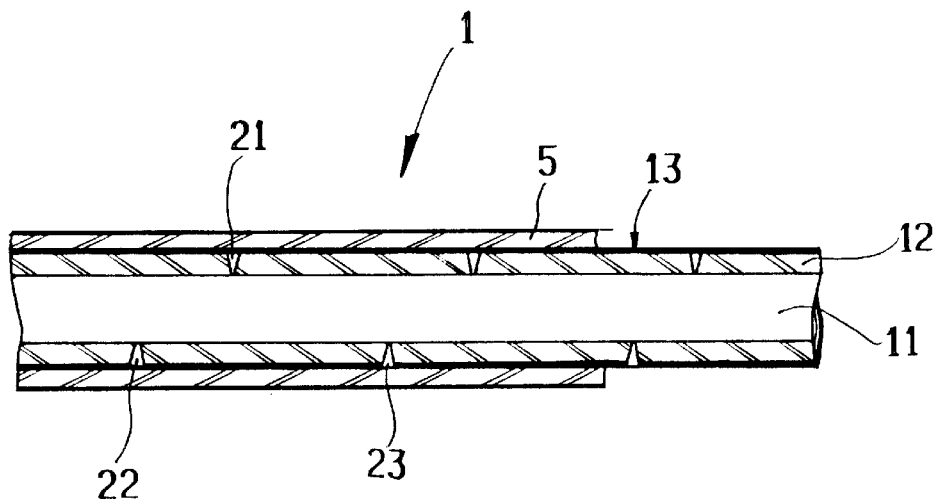
FIG. 3 shows another cross sectional view of the optical fiber in the present invention.
Figures 1, 3:
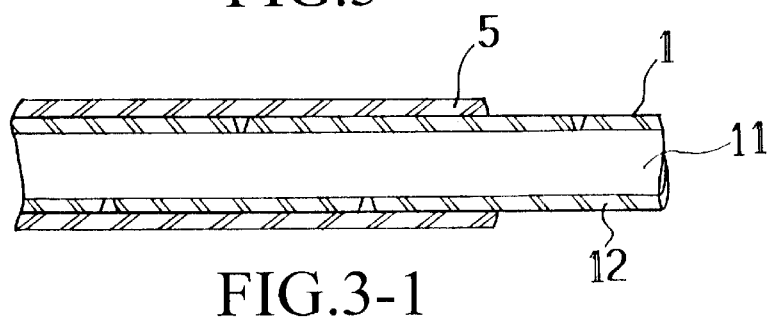

Moreover, as shown in FIG. 3, to protect the optical fiber 1, a transparent protective layer 5 is provided to enclose the opaque outer layer 13. This transparent protective layer 5 prevents dust from blocking the plurality of micro-windows 21, 22 and 23 and allows light from the plurality of micro-windows 21, 22 and 23 to pass through. Moreover, the material of the transparent protective layer 5 is endurable and flexible to provides enhanced safety to the fiber mesh woven by those optical fiber 1.

Figure 4:
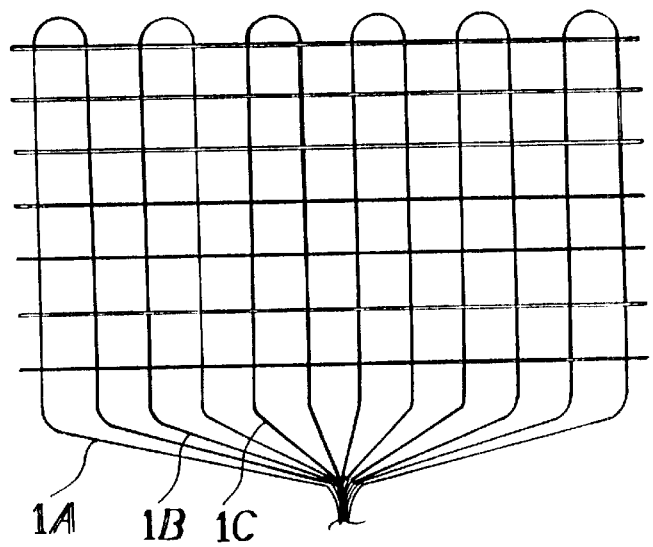
FIG. 4 shows the second preferred embodiment of the invention.

As shown in FIG. 4 which shows the second preferred embodiment of the invention, the fiber mesh is woven by optical fibers 1A, 1B and 1C etc. Each fiber forms an upward close loop and has both ends connected to the light source.

Figure 5:
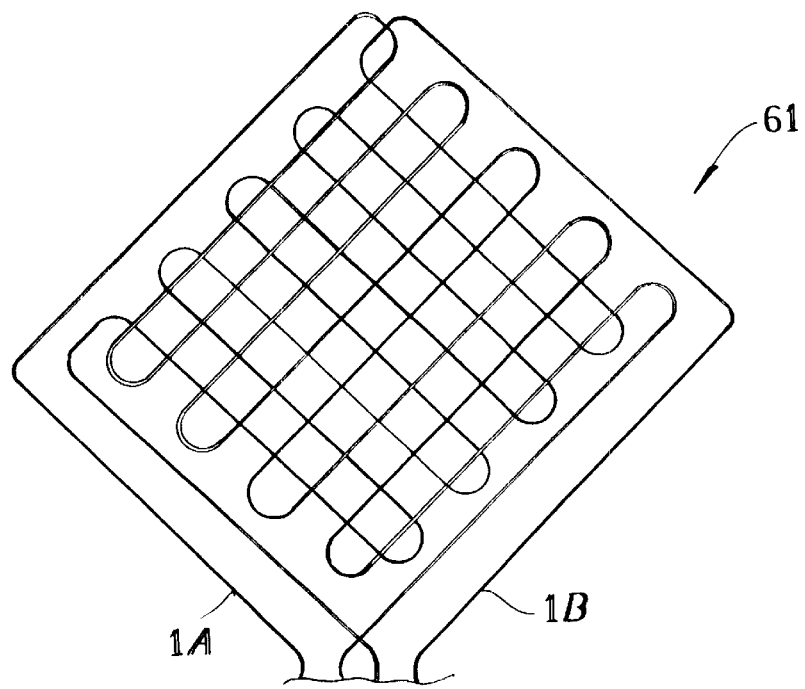
FIG. 5 shows the third preferred embodiment of the invention.

FIG. 5 shows the third preferred embodiment of the invention. The fiber mesh is woven by optical fibers 1A and 1B, wherein the optical fibers 1A and 1B are cross to each other to forms a light emitting mesh.

Figure 6:
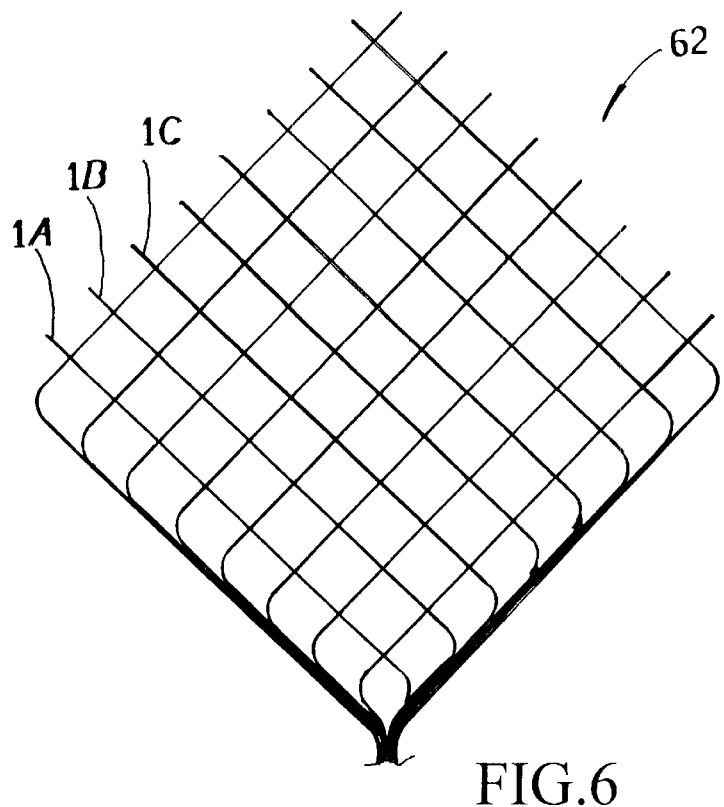
FIG. 6 shows the fourth preferred embodiment of the invention.

FIG. 6 shows the fourth preferred embodiment of the invention. The light emitting mesh 62 is composed of a plurality of optical fibers 1A, 1B and 1C, etc., wherein the plurality of optical fibers 1A, 1B and 1C are classified into two set of fibers. Each set of fiber extends toward different direction and after a bending portion, their free end extend to another direction.

Moreover, to provide radial illumination, as shown in FIG. 3-1, the opaque outer layer 13 is removed and the transparent protective layer 5 is provided to directly enclose the cladding layer 12. Because the optical fiber has a predetermined amount of propagating loss, part of lightwave can emit radially through the cladding layer 12 and the transparent protective layer 5, beside through the micro-windows, thus providing a mesh-like light pattern.

As can be seen from above description, due to the flexibility of the optical fiber, the mesh woven by the optical fibers can be used to cover the tree or flower to be decorated. Moreover, the light-emitting mesh can also be woven by fiber bundles.

Moreover, the transparent protective layer 5 can be used to enclose a plurality of optical fibers to provide protecting effect.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A light emitting decorative article comprising:

a) at least one optical fiber with first and second ends, and arranged in a serpentine configuration including at least three parallel portions, the single optical fiber having a core, and a cladding layer on the core, the cladding layer having a plurality of notches therein forming micro-windows enabling transmission of light from the core therethrough;

b) a transparent protective layer covering the cladding layer including the plurality of notches;

c) an opaque layer between the transparent protective layer and the cladding layer, the opaque layer having a plurality of openings aligned with the plurality of notches in the cladding layer; and, d) a light source connected to both the first and second ends of the optical fiber, whereby starry light is emitted from the decorative article.

2. The light emitting decorative article of claim 1 further comprising a plurality of supporting lines connected to the at least three parallel portions to hold the at least one optical fiber in the serpentine configuration.

* * * * *